United States Patent
Kimura et al.

[11] Patent Number: 5,186,200
[45] Date of Patent: Feb. 16, 1993

[54] RESERVOIR ARRANGEMENT FOR USE IN AUTOMOTIVE FUEL TANK

[75] Inventors: Shigeru Kimura; Atsushi Takahashi; Masaharu Shibao; Kazuyuki Tomioka, all of Yokohama, Japan

[73] Assignee: Nifco, Inc., Yokohama, Japan

[21] Appl. No.: 739,156

[22] Filed: Aug. 2, 1991

[30] Foreign Application Priority Data

Aug. 3, 1990 [JP] Japan ................... 2-206045

[51] Int. Cl.⁵ .............................. F16L 55/18
[52] U.S. Cl. .................... 137/15; 137/576; 220/4.13
[58] Field of Search .............. 137/574, 576, 15; 220/4.05, 4.06, 4.13

[56] References Cited

U.S. PATENT DOCUMENTS

| | | | |
|---|---|---|---|
| 1,993,917 | 3/1935 | Byerlein | 220/4.05 |
| 4,297,846 | 11/1981 | Cadeddu | 137/574 |
| 4,324,272 | 4/1982 | Parks et al. | 137/574 |
| 4,354,521 | 10/1982 | Harde | 137/574 |
| 4,579,242 | 4/1986 | Ellis, II | 220/4.13 |

FOREIGN PATENT DOCUMENTS 56-138718 10/1981 Japan.
59-43132 12/1984 Japan.

Primary Examiner—A. Michael Chambers
Attorney, Agent, or Firm—Jacobson, Price, Holman & Stern

[57] ABSTRACT

The present invention relates to a rotary tank system to be provided inside a fuel tank for vehicles such as automobiles which is characterized in that it basically comprises two parts that are made of a material that can be hot-welded together, and at least a portion each of the contact faces between the first and the second halves of the tank is heated to molten state and subsequently abutted against each other in order to weld the two halves into an integral member.

6 Claims, 9 Drawing Sheets

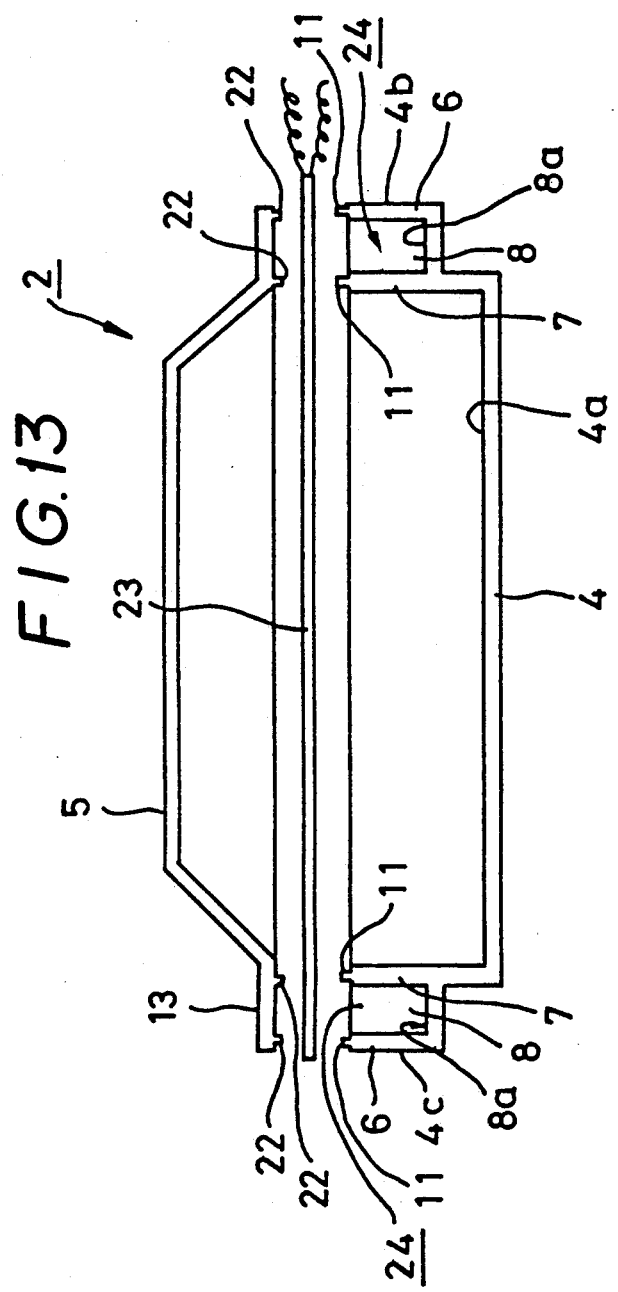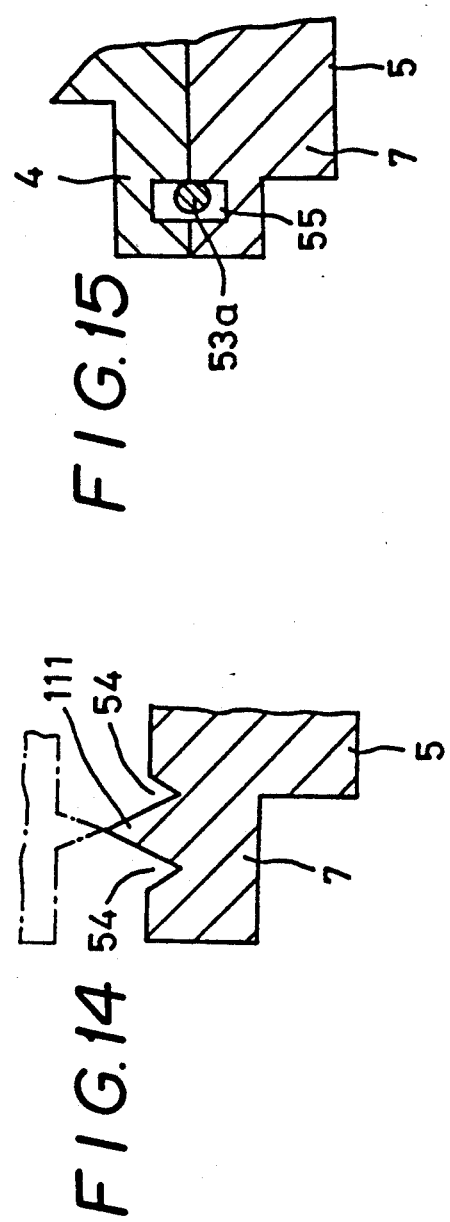

RESERVOIR ARRANGEMENT FOR USE IN AUTOMOTIVE FUEL TANK

OUTLINE OF THE INVENTION

The present invention relates to reservoir arrangement hereinafter referred to as a rotary tank system to be provided inside the fuel tank of a vehicle such as an automobile.

More particularly, it relates to a rotary tank system which is capable of securely pumping out the fuel inside the tank even if the surface level of the fuel is slanted due to centrifugal force caused by careening of the vehicle.

Still more particularly, the present invention relates to a rotary tank system which comprises two members, a first and a second halves of a tank made of a material that can be hot-welded so that at least a portion each of the contact faces between the first and the second halves of the tank is heated and then abutted against each other to be fused together into an integral body.

DETAILED DESCRIPTION OF THE INVENTION

Background of the Invention

Figure 1:
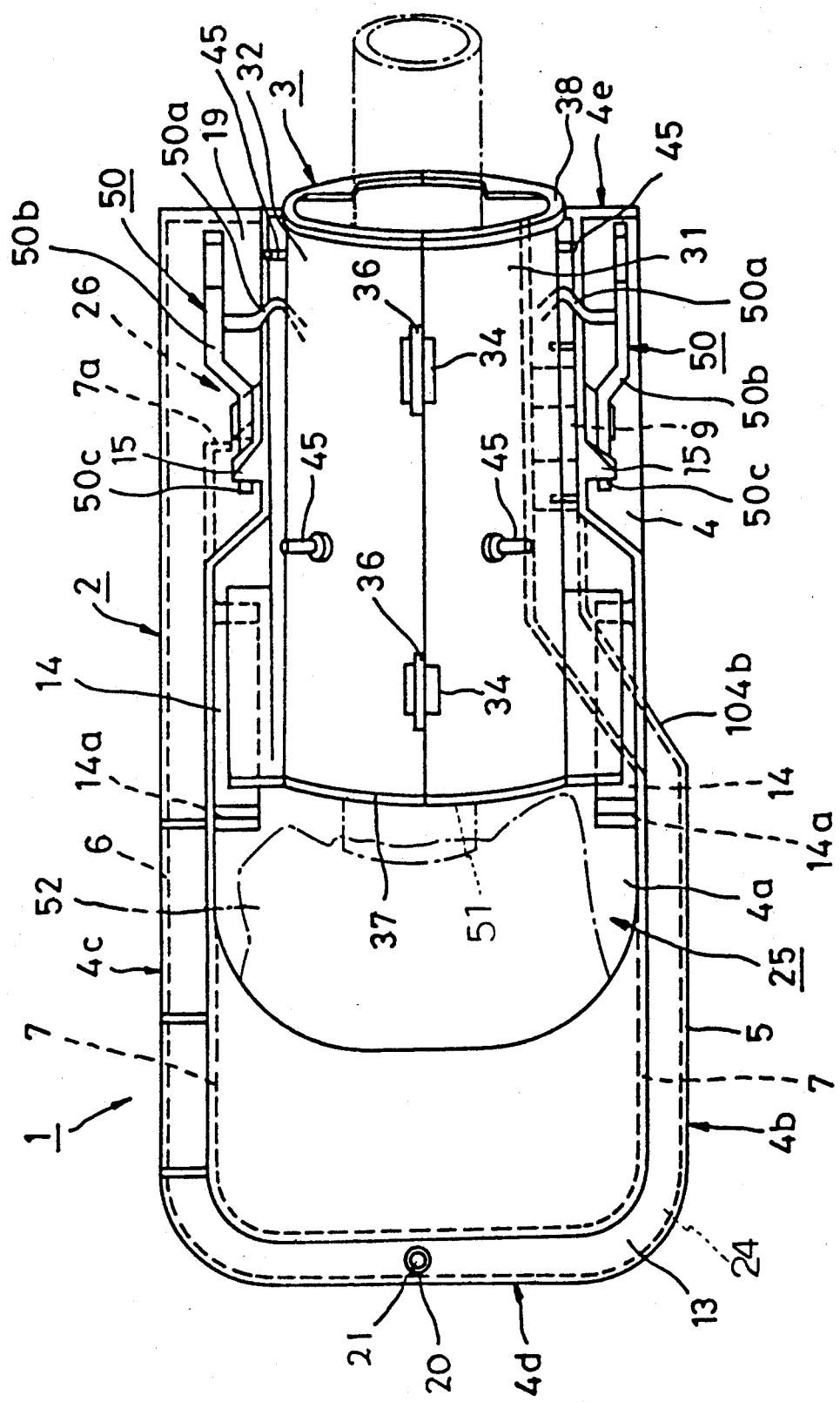

Vehicle fuel tanks are usually provided with an auxiliary rotary tank in order to assure suctioning of the fuel by a pipe even when the surface level of the fuel inside the fuel tank is slanted due to centrifugal force caused by the careen of the vehicle.

As one example of fuel tank provided with a rotary tank of this type, there is known an invention described in the Japanese Utility Model Application Laid-open No. Sho 56-138718. U.S. patent applications Nos. 07/1446,524 (filed on Dec. 7, 1989) and 07/1646,900 (filed on Jan. 28, 1990) are also known.

In the prior art rotary tank such as mentioned above, the fuel tank and the rotary tank are in constant communication with each other by means of a tubular fuel guide passage. The fuel guide passage is formed tubular with a groove which is provided at the lower side of the tank body and a chamber plate which is inserted inside the groove and closes the opening of the groove. The fuel guide passage of the rotary tank is closed by the chamber plate which is pressed into the groove provided at the lower side of the tank body and is subsequently fixed by ultrasonic welding. If the sealing between the chamber plate and the groove is instable, fuel is likely to leak into the fuel tank from the guide passage, making it difficult to maintain a predetermined amount of fuel inside the rotary tank at all times.

The prior art rotary tank is further defective in that the operation of pressing the chamber plate into the groove and connecting the two members by ultrasonic welding is highly inefficient and costly.

Objects of the Invention

The present invention aims at improving the prior art rotary tank for a vehicle fuel tank.

One of the main objects of the present invention is to provide a rotary tank which comprises a first and a second halves of the tank made of a material that can be hot-welded together, and at least a portion each of the contact face between the first and the second halves is heated and fused together to easily form an integral member.

Another object of the present invention is to provide an inexpensive rotary tank by forming the same with such a structure and according to such a method as mentioned above.

Still another object of the present invention is to enable standardization and mass production of rotary tanks by forming the same according to the above mentioned structure and the method.

Still another object of the present invention is to improve the sealing of the fuel guide passage as well as of the rotary tank by providing in the first half of the tank a groove which constitutes the fuel guide passage and by placing the second half of the tank atop the first half over this passage before welding the two halves together.

Still another object of the present invention is to provide a rotary tank wherein the fuel leakage from the passage inside the rotary tank into the fuel tank is prevented by improving the sealing of the rotary tank, so that a predetermined amount of fuel can be constantly and stably maintained in the rotary tank.

Other objects of the present invention will become apparent from the detailed description below and the scope of the claims.

Figure 2:
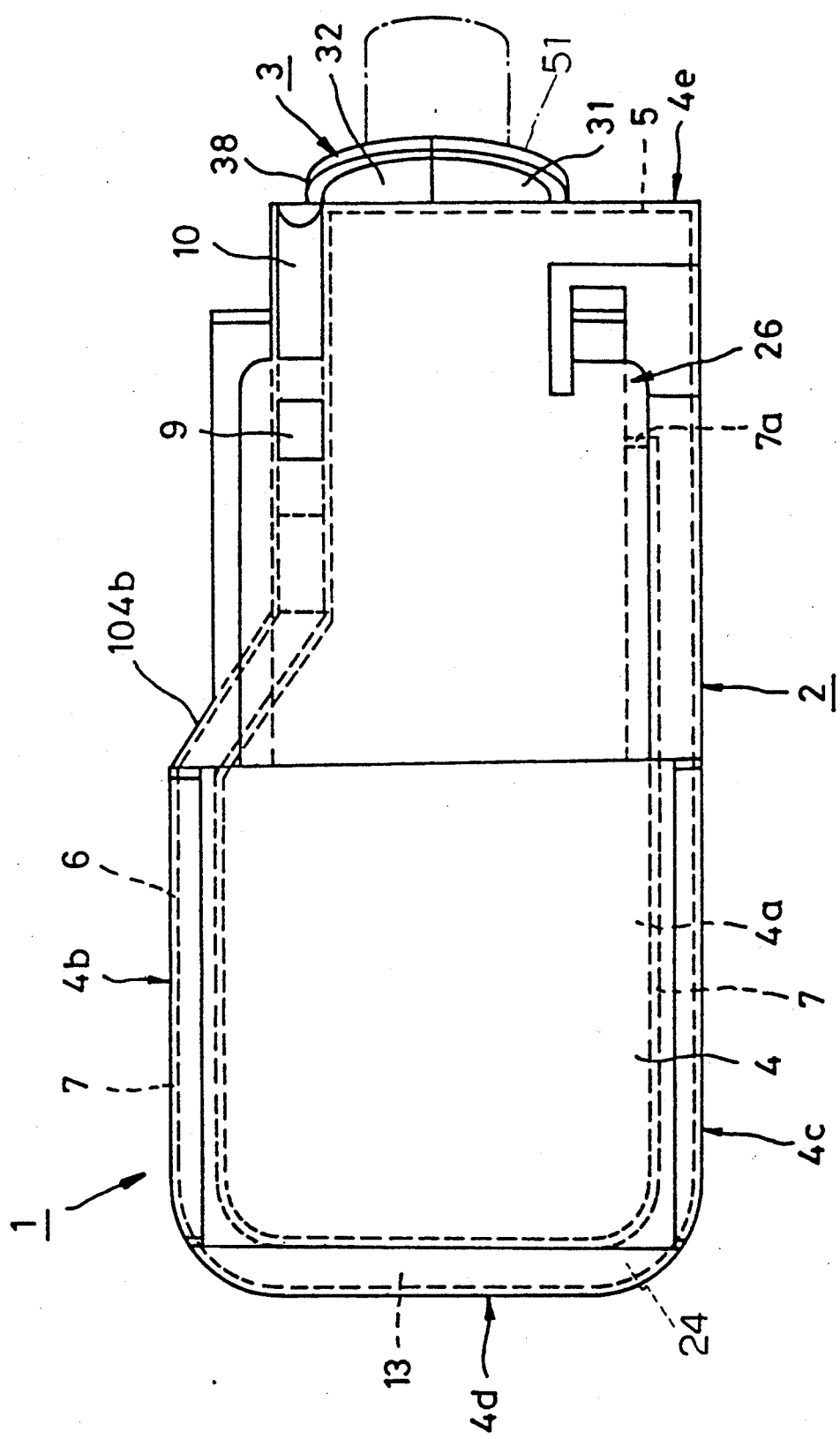
Figure 3:
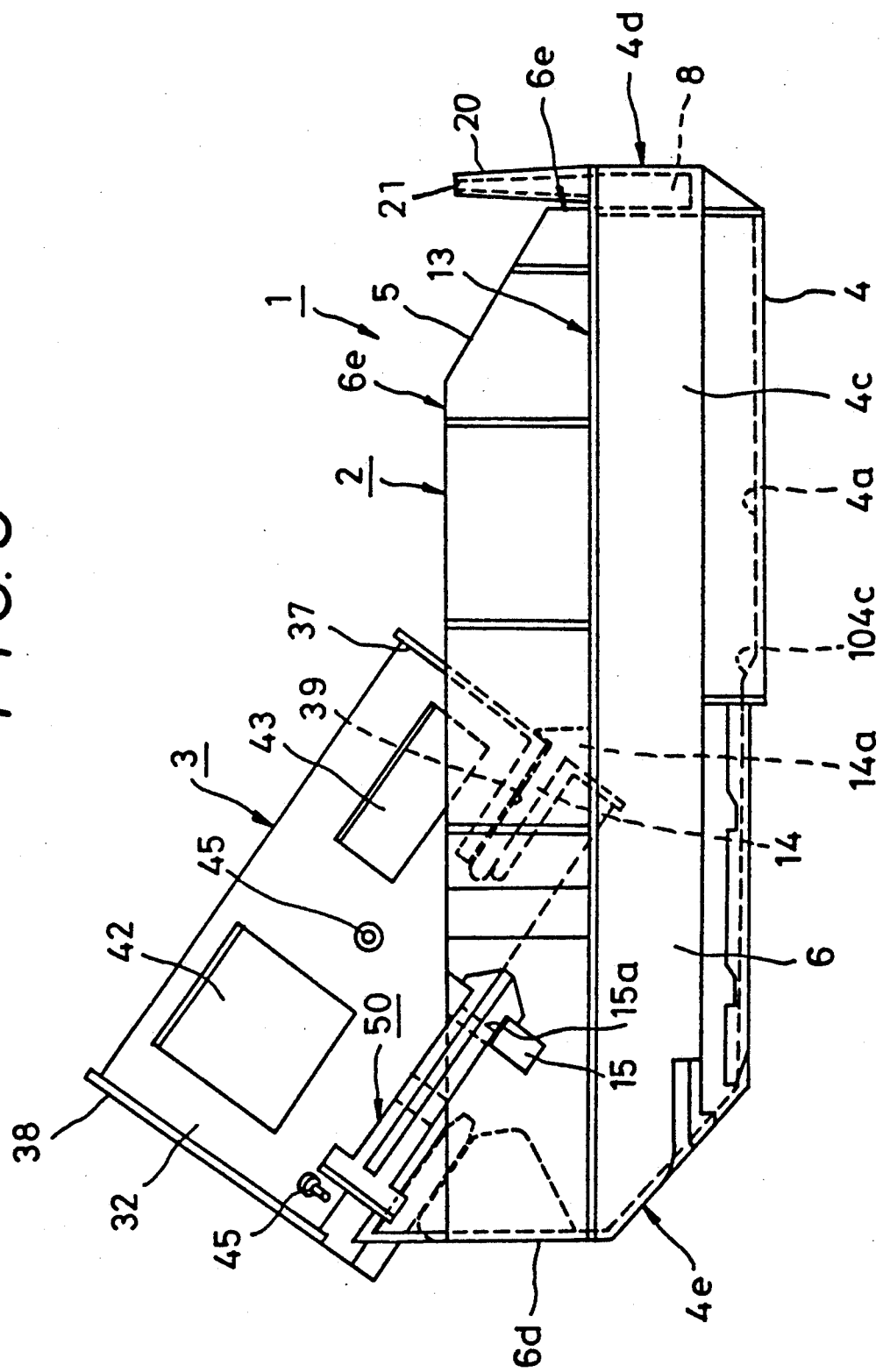
Figure 4:
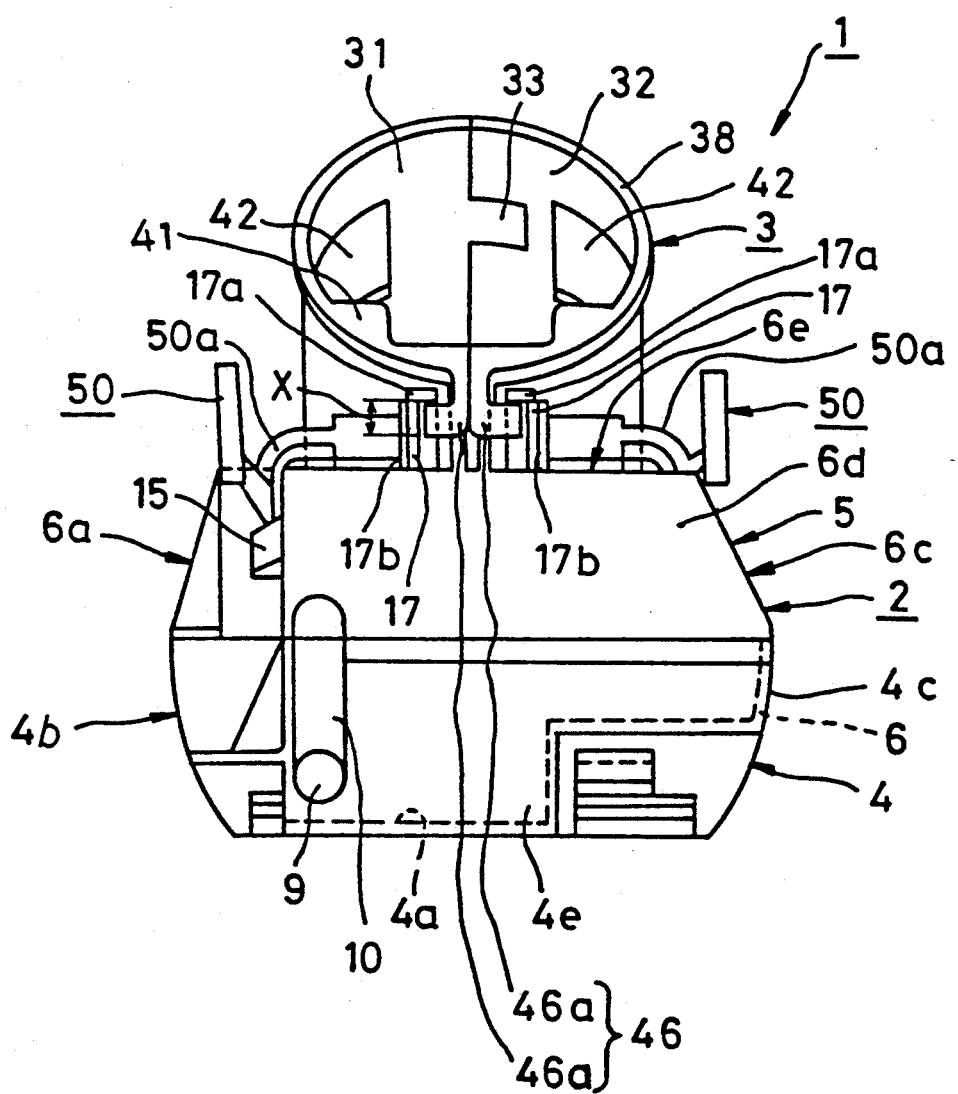
Figure 5:
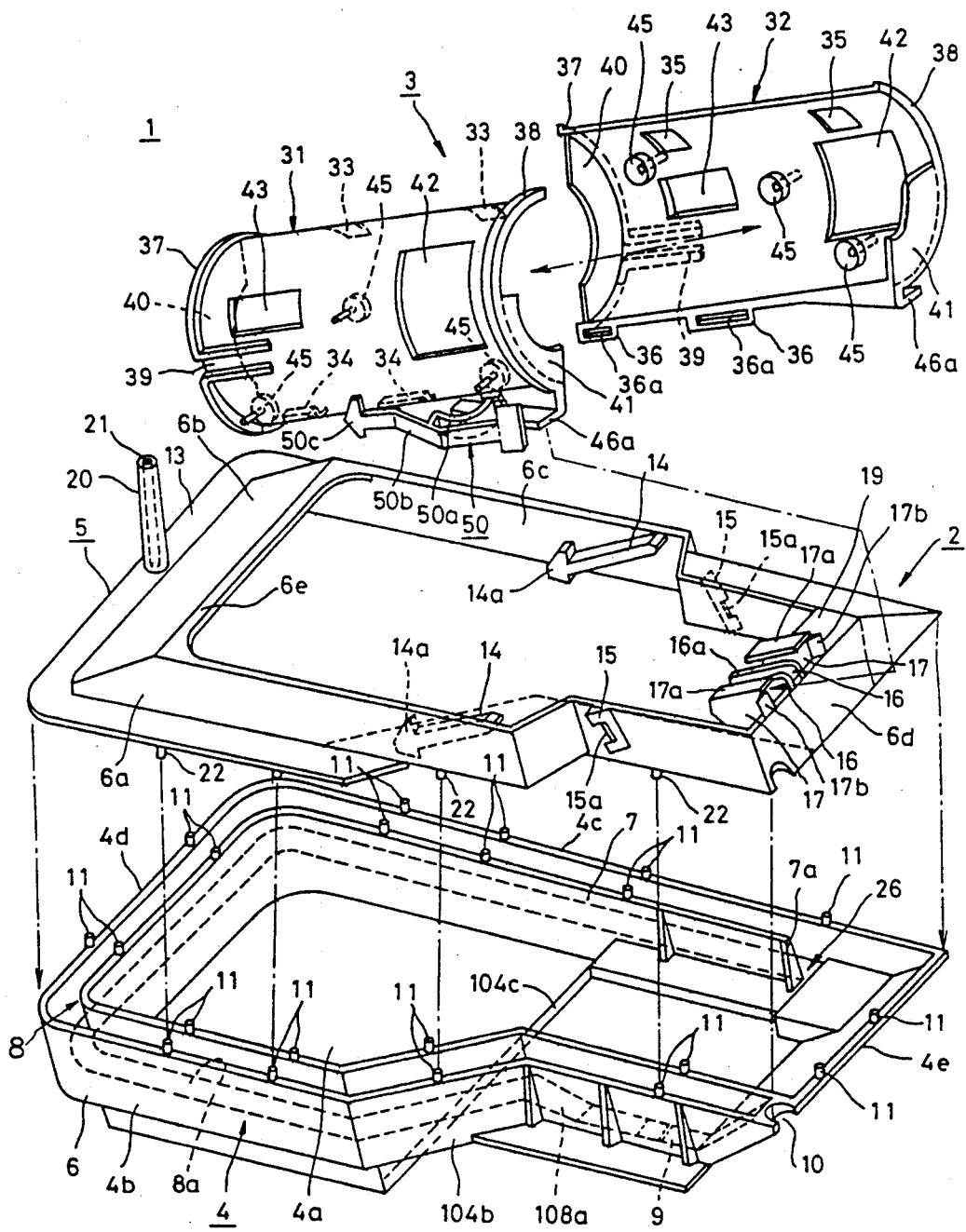
Figure 6:
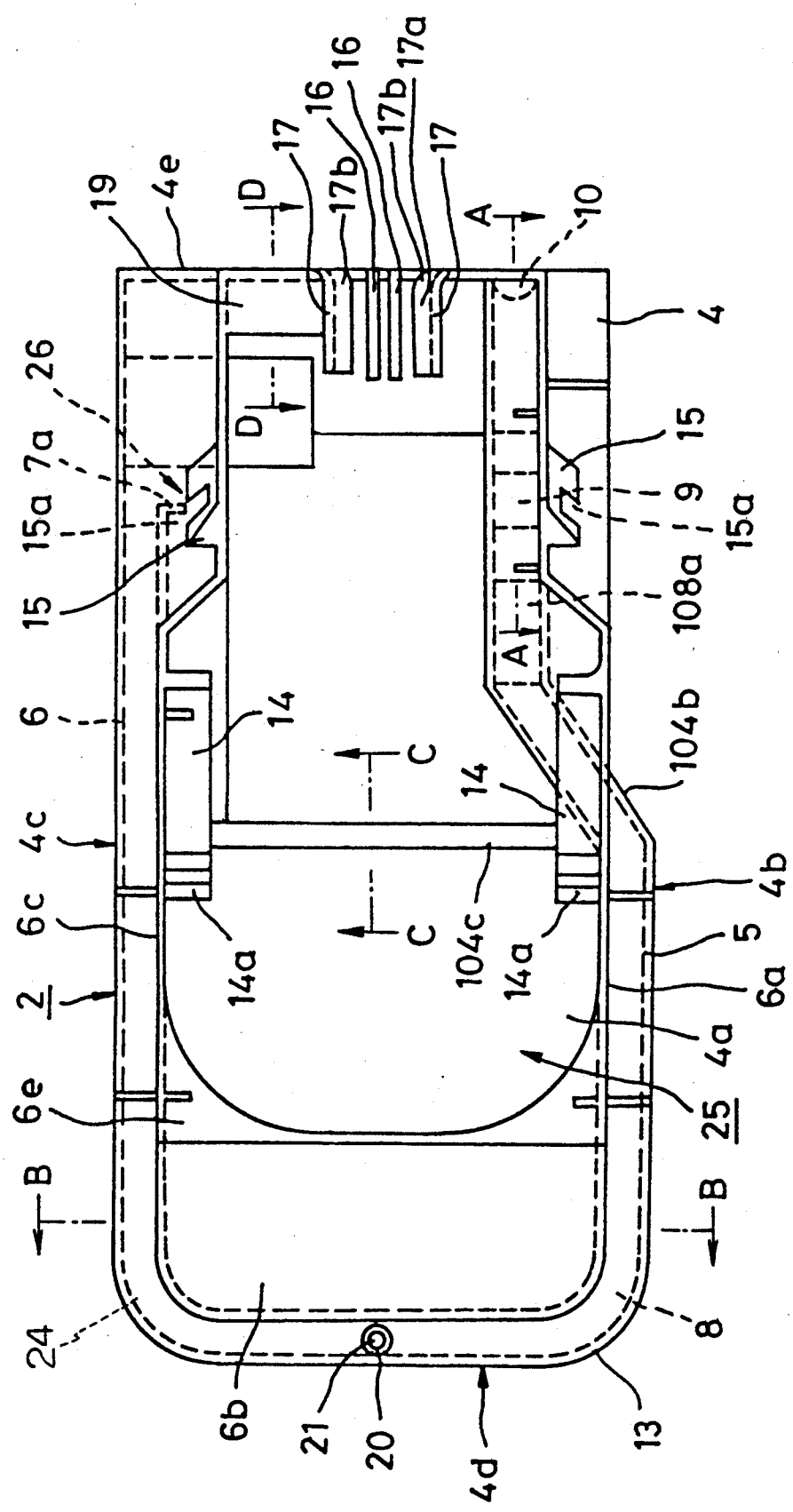
Figure 7:
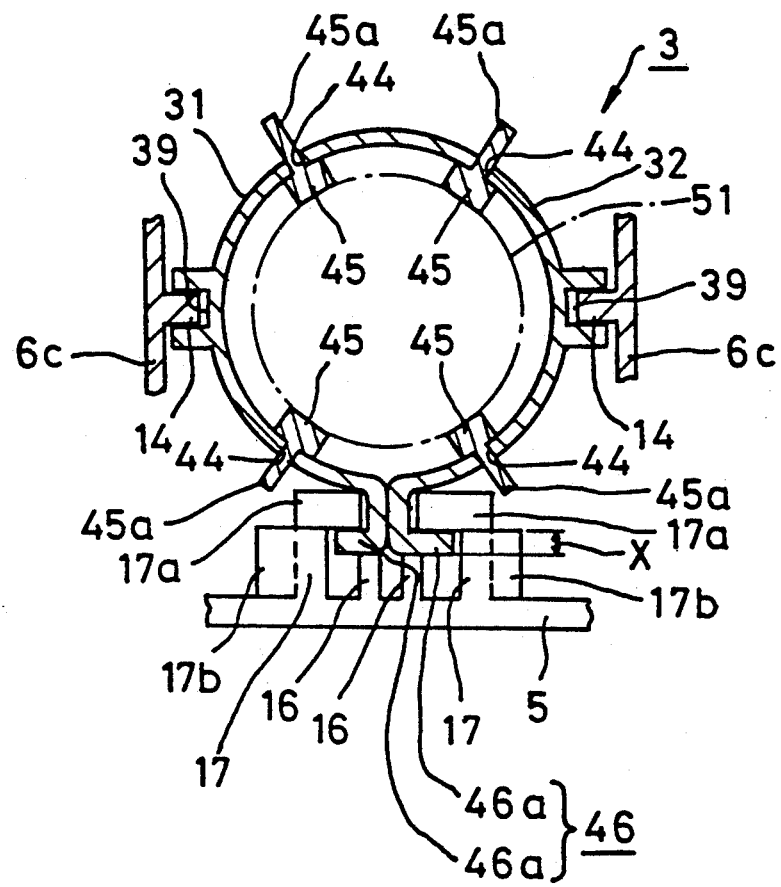
Figure 8:
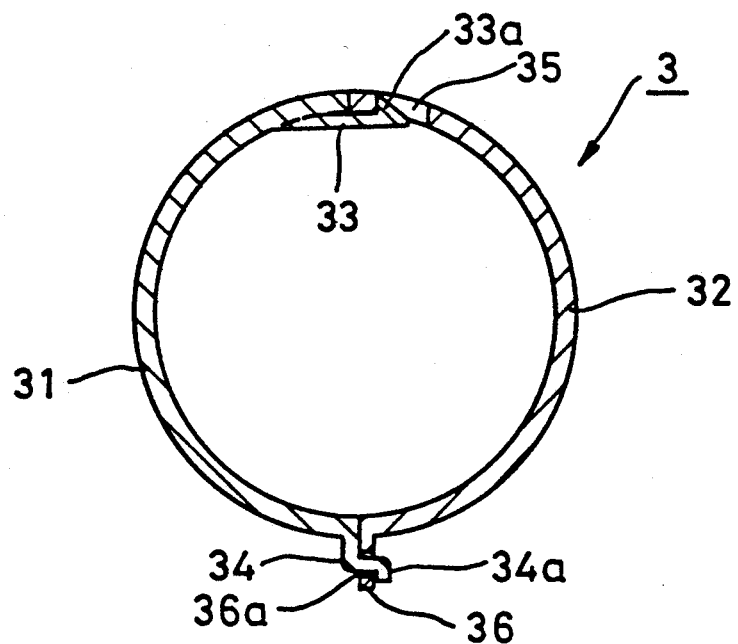
Figure 9:
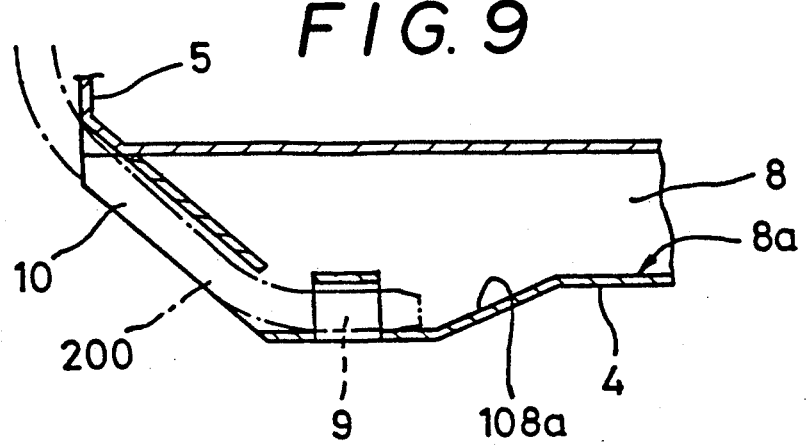
Figure 10:
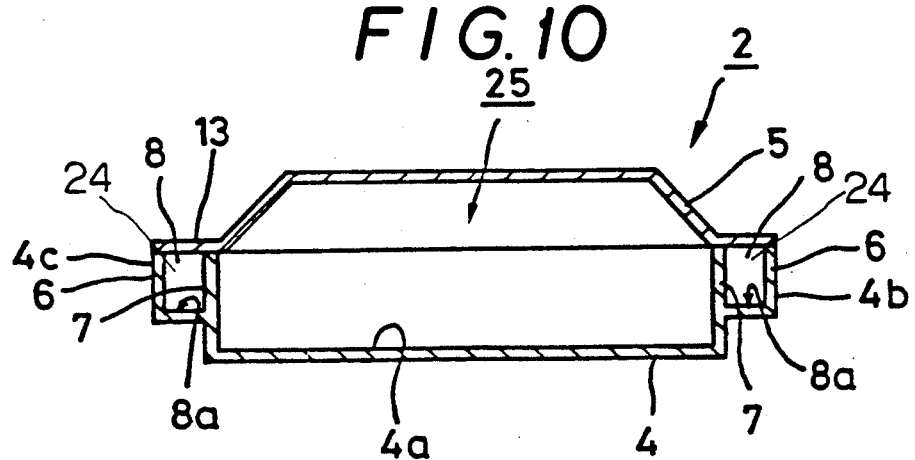
Figure 11:
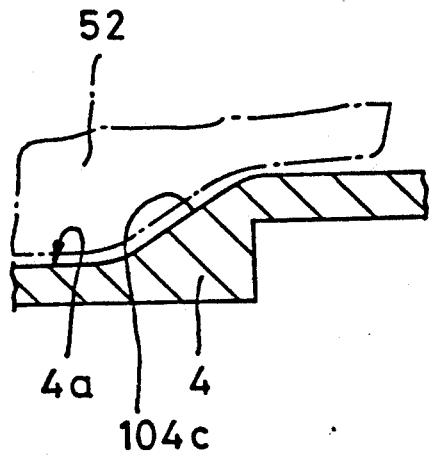
Figure 12:
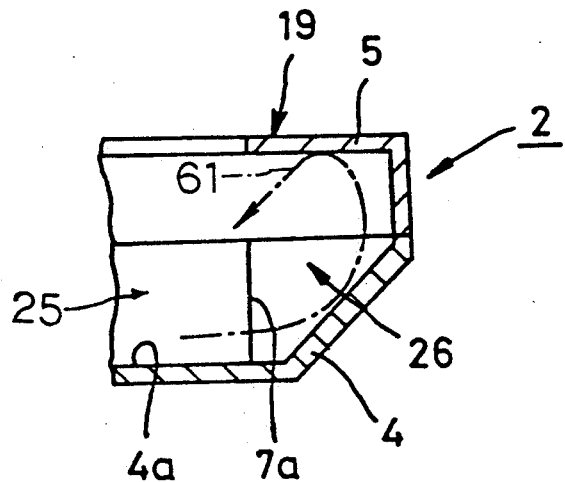

In the accompanying drawings, FIG. 1 is a top view of the rotary tank system according to the present invention. FIG. 2 is a bottom view thereof. FIG. 3 shows the rotary tank system of FIG. 1 viewed from the side of the side wall 4c. FIG. 4 shows the right hand side of the rotary tank system as shown in FIG. 1. FIG. 5 is a perspective view to show the component parts of the rotary tank system. FIG. 6 is a top view to show the rotary tank system when the pump bracket 3 is removed. FIG. 7 is a sectional view to show the essential parts of the pump bracket 3 where they are fixed. FIG. 8 is a sectional view to show the pump bracket when assembled. FIG. 9 is an enlarged sectional view taken along the line A—A in FIG. 6. FIG. 10 is a sectional view taken along the line B—B in FIG. 6. FIG. 11 is an enlarged sectional view taken along the line C—C in FIG. 6. FIG. 12 is an enlarged sectional view taken along the line D—D in FIG. 6. FIG. 13 is a schematic view to show how the first and the second halves of tank constituting the rotary tank system according to the present invention are welded together. FIG. 14 is an enlarged sectional view to show the part where the first and the second halves of the tank are heated for welding. FIG. 15 is an enlarged sectional view to show another embodiment of the first and the second halves at their junction.

EMBODIMENTS

The present invention will now be described in detail referring to embodiments and attached drawings.

FIGS. 1 through 5 are views to show one embodiment of the rotary tank system according to the present invention.

In the drawings, the rotary tank system 1 basically comprises a rotary tank 2 and a pump bracket 3.

More particularly, the rotary tank 2 is a molding, for example, of a resin reinforced with glass fibers or of polyacetal and includes a first half 4 and a second half 5. The first half 4 is in the form of a flat box with an open top and comprises a bottom wall 4a, and a continuous outer wall 6 including side walls 4b and 4c and rear and front walls 4d and 4e that are integrally erected from the bottom wall. The front wall 4e is progressively slanted toward the lower side. The mid portion 104b of the side wall 4b is bent inward as it extends from the rear toward the front, so that the distance between the side wall 4b at the front portion beyond said mid portion 104b and the side wall 4c is smaller than the distance between the two side walls at other portions. A continuous inner wall 7 is provided inside the first half 4 to oppose the side wall 4b, the rear wall 4d and the side wall 4c. A groove 8 with an open top is formed between the inner wall 7 and an outer wall 6. On the side where the inner wall 7 opposes the side wall 4c, it terminates at one end 7a and is bent inward at a right angle at a position falling a little short of the front wall 4e. At the end 7a, the groove 8 opens further inward than the portion which is enclosed by the inner wall 7. On the side where the inner wall 7 opposes the side wall 4b, the inner wall 7 reaches the inner face of the front wall 4, and the bottom wall 8a of the groove 8 is provided with an opening 9 as an inlet for fuel contained in the fuel tank (not shown) (FIGS. 2, 4 and 9). At the bottom wall 8a of the groove 8, the groove portion 108a which is more to the front side with respect to the mid portion 104b of the side wall 4b is slanted downward as it extends farther toward the front wall 4e. In order to position and fix a return gasoline pipe 200 (FIG. 9) to the portion on the outer face of the front wall 4e corresponding to the groove 8, a guide groove 10 is indented inward. Small projections 11 for welding are integrally provided on the top faces of the inner wall 7 and of the outer wall 6 respectively. The mid portion 104c of the bottom wall 4a is gradually slanted upward the rear side (FIGS. 3 and 11), the slope being effective in reducing the wear of a filter 52 to be described below.

The second half of the tank 5 has a configuration which corresponds to the upper outer configuration of the first half of the tank 4. As shown in FIG. 10 in which the first and the second halves of the tank 4 and 5 are assembled, a lid 13 is formed to close the groove 8, covering both the outer wall 6 and the inner wall 7. At the bottom face of the lid 13, projections 22 are integrally provided, corresponding to the small projections 11 of the first half 4. The side walls 6a, 6b, 6c and 6d are continuously erected from the lid 13, while the top surface 6e is provided on the side toward the front. The rest is in open state. On the inner face of the side walls 6a and 6c respectively, a guide wall 14 is provided, which is slanted from the top toward the bottom as it extends toward the rear. At the lower tip end of the guide wall 14 is formed a stopper 14a. On the side of the outer face of position somewhat toward the front. The lock means 15 is provided with a notch 15a which is in the form of a letter U to corresponds with the inclination of the guide wall 14. On the inner side of the side wall 6d on the front side, there are provided two lower guide strips 16 and two upper guide strips 17 integrally with said side wall 6d. The two lower guide strips 16, 16 are parallel to each other, and are slanted at an inclination corresponding to the guide wall 14. The two upper guide strips 17, 17 are positioned on both sides of the lower guide strips 16. The upper faces thereof are bent inward to form the upper stopper strips 17a. Each of the upper stopper strips 17a is also inclined to correspond to the inclination of the guide wall 14. There is provided a clearance X between the inner face of the upper stopper strip 17a and the upper face of the lower guide strip 16 (FIG. 7). On the front side of the upper stopper strips 17a are provided guide wings 17b which are included outward respectively. On the front side of the second half tank 5, there is formed a top surface 19 in the upper portion where it corresponds to the inner wall 7a of the first half tank 4. Additionally, a tubular member 20 is integrally formed at the back of the lid 13. The tubular member 20 is formed with a through-hole 21 that extends in the vertical direction. The upper guide strips 17 and the lower side strips 16 are formed substantially in the letter T form in section as shown in the figure, so that the upper and the lower portions can be removed from the mold by vertically splitting it into two.

To clamp and secure a pump 51 (FIGS. 1, 2 and 7), the first half 4 of the tank is first placed opposing the second half 5 of the tank, as schematically shown in FIG. 13, and a plate 23 heated to approximately 300°–400° C. is interposed therebetween to melt the projections 11 of the first half tank 4 and the projections 22 of the second half tank 5. The melted projections both on the first and the second halves of the tanks 4 and 5 are abutted against each other to be welded into an integral member to form a rotary tank body 2. In the rotary tank body 2 thus integrated, the upper face of the groove 8 is closed by the second half 5 to form a fuel guide passage 24 in the tubular form. The inner wall 7 and the second half 5 define a void 25 inside to be used as an auxiliary tank, as shown in FIG. 10. The fuel inside the fuel tank (not shown) is sucked into the fuel guide passage 24 (groove 8) via the opening together with the fuel recycled from the engine by means of the return gasoline pipe 200. The fuel further travels through the fuel guide passage 24, passes the opening 26 between the end 7a of the inner wall 7 and the inner face of the front side wall 4e to flow into the void 25 to be pooled therein. As the fuel inside fuel tank is taken in, temperature of the fuel inside the rotary tank body 2 decreases to prevent vapour-lock. When the fuel is introduced into the void 25 via the opening 26, the fuel 61 gushing through the opening 26 runs against the top surface 19 located above the opening 26 and is returned into the void 25. The tubular member 20 with a vertical through-hole 21 is provided on the lid 13, whereby when the rotary tank body 2 is lifted up at its back, air enters the fuel guide passage 24 via the through-hole 21. The fuel which has already entered the passage 24 is divided into two sections by the incoming air.

The pump bracket 3 may be a molding of resin reinforced with glass fibers or of polyacetal which is substantially in the form of a hollow tube. It is divided into a first bracket shell 31 and a second bracket shell 32 along the vertical line substantially at the center which are substantially symmetric with respect to this line except for portions where the two members are engaged and connected. Description is now made to the differences between the first and the second bracket shells 31 and 32. A pair of stopper strips 33, 33 are provided along the divided edge on the upper surface of the first bracket shell 31, projecting toward the second shell 32 and distanced from each other in the lateral direction. Catches 33a are provided at respective tip ends of the stopper strips 33 (FIG. 8). Keys 34, 34 projecting toward the second bracket shell 32 are provided along the divided edge on the lower surface of the first bracket shell 31. As shown in FIG. 8, the tip end 34a of the respective keys 34 is bent downward. Near the divided edge on the upper surface of the second bracket shell 32 are provided holes 35 to receive the catches 33, and locking members 36 with holes 36a respectively are provided along the divided edge on the lower surface to correspond with the keys 34. To assemble the first and the second halves of the tank 31 and 32, as schematically shown in FIG. 8, the key 34 is inserted in the hole 36a so that its tip 34a is locked against the locking member 36. At the same time, the stopper strip 33 is inserted in the hole to cause the catch 33a to be engaged with the hole 36a at its edge.

As for the first and the second bracket shells 31 and 32 where they are formed symmetric, explanation will be given with respect to the first bracket shell 31 alone. The reference numbers given in the second bracket shell 32 that are identical with those in the first bracket shell 31 denote the same parts. The bracket shell 31 is semi-circular in section and is provided with flanges 37 and 38 on both ends in the longitudinal direction. At the mid portion, the flange 37 is cut and bent inward in parallel to form a guide groove 39 which slidably receives a guide wall 14. A rear face member 40 which closes a portion of the opening at the rear is integrally formed at the rear of the bracket shell. A front face member 41 is likewise provided at the front to close a portion of the opening there. Rectangular windows 42 and 43 are cut out on the peripheral surface. A plurality of small through-holes 44 (FIG. 7) is also provided on the peripheral surface, into which a portion 45a of a rubber cushion 45 each is inserted from the inside. Additionally, a lip member 46a is integrally formed at the peripheral surface on the front side, the lip member extending downward and being bent substantially at a right angle outwardly at the lower end, so that when the first and the second bracket shells 31 and 32 are assembled, there will be formed an insertion strip 46 which is shaped substantially like an inverted letter T in vertical section and which can be slidably inserted in the space formed by the lower guide strips 16 and the upper stopper strips 17a, 17a of the pair of upper guide strips 17 on the side of the rotary tank body 2. A lock member 50 is provided on the peripheral surface adjacent said lip member 46a. The lock means 50 comprises an elastic arc member 50a which is curved outward and a lock plate 50b which is fixed with the elastic arc member 50a substantially at its mid portion. At the tip end of the lock plate 50b, a catch 50c is formed to engage with the stopper section 15 in the rotary tank body 2.

In order to assemble the first and the second bracket shells 31 and 32 into the pump bracket 3, a rubber cushion 45 each is attached to respective small through-holes 44, and engagements between the locking member 36 and the key 34, and between the stopper strip 33 and the stop hole 35 are effected to form a tubular assembly. A fuel pump 51 is inserted from the front side of the pump bracket 3 to project outwardly from the rear side. A net filter 52 is attached at the tip end of the pipe. In this state, the guide wall 14 and the insertion strip 46 are so placed that the former would come to a position that corresponds to the guide groove 39 and the latter to a position that corresponds to where the lower guide strip 16 and the upper guide strip 17 are arranged. As these members are gradually inserted, the locking strip 50a and the stopper means 15 collide with each other. Further along, the catch 50c at the tip of the locking strip 50a climbs over the stopper means 15 by becoming elastically deformed. Subsequently, the locking strip 50a restores its original shape, and the catch 50c at the tip of the locking strip 50a becomes engaged with the stopper member 15. At the same time the flange 37 of the pump bracket 3 collides against the stopper 14a of the guide wall 14 and is stopped its advance, whereby the pump bracket 3 is attached to the rotary tank body 2. In this state, the insertion strip 46 (46a, 46a) is inserted between the lower guide strip 16 and the upper guide strip 17 and held fixed.

In order to dismantle the pump bracket 3 from the rotary tank body 2, the lock means 50 provided each on the first and the second shells is pressed inward from the front. The curved portion 50a and the locking plate 50b both deform elastically, and the locking strip 50b on the rear side turns outwardly to disengage the catch 50c and the stopper means 15. By pulling the entire pump bracket toward the front when the pertinent members are being disengaged, the entire rotary tank body 2 can be detached.

Thus, when the small projections 11 on the first half 4 of the tank and the small projections 12 on the second half 5 are melted by the heating panel 23 and are abutted against each other, an integral tank body 2 can be easily formed. This greatly improves the operation efficiency and reduces the cost. Since the groove 8 is provided to form the fuel guide passage 24 on the first half 4 of the tank which forms the lower member of the assembly so that the second half 5 of the tank is placed over the groove 8 to close the same, sealing of the fuel guide passage 24 and the tank body as a whole improves remarkably.

Although the above described embodiment is provided with projections 11 and 22 as the members to be melted, these members can be formed as a continuous member such as a strip. This will further improve the sealing performance.

It is also noted that, as shown in FIG. 14, a groove 54 may be formed around the portion 53 to be melted, so that the excess molten member can be released inside this groove 54. This improves the appearance because the molten member of the portion 53 is prevented from coming out from between the first and the second half tanks 4 and 5.

As shown in FIG. 15, a groove 55 may be formed on the first and the second half tanks 4 and 5 respectively at a corresponding location, so that excess molten member from the portion 53a can be released into the groove. Similarly as in FIG. 14, a fine appearance can be maintained this way.

As has been described in the foregoing, the rotary tank system for vehicle fuel tank according to the present invention can be easily formed by heating a portion each of the first and the second halves of the tank using a heating panel and abutting the two halves for welding into an integral body.

By forming a groove on the first half of the tank which is the lower half of the tank to define the fuel guide passage and by placing the second half over the groove to close the same, the sealing of the fuel guide passage as well as the tank system as a whole will improve.

What we claim:
1. A method of manufacturing a rotary tank for the interior of a vehicle fuel tank, the rotary tank including a fuel storage space, a fuel guide passage for delivering fuel into said space and a fuel discharge means for discharging fuel from said space into the fuel tank, the method comprising providing a first tank half and a second tank half and connecting the tank halves together along contact surfaces of the respective tank halves to form the rotary tank wherein the method includes the steps of providing the contact surface of at least one of the tank halves with welding projection means, heating and melting said projection means by a heating-panel positioned between the tank halves and welding the contact surfaces together by means of the melted projection means.

2. A method as defined in claim 1 wherein the contact surfaces of the tank halves are provided with mutually aligned welding projection means which are mutually abutted to weld the tank halves together.

3. A method as claimed in claim 1 wherein a first of said tank halves has opposed walls defining said fuel guide passage and upper edges of said walls defining the contact surface of said first tank half and wherein the contact surface of the other tank half defines a lid for the guide passage.

4. A method as defined in claim 3 wherein the contact surfaces of the tank halves are provided with mutually aligned welding projection means which are mutually abutted to weld the tank halves together.

5. A method as defined in claim 1 wherein said projection means comprises a plurality of discrete projections space along said contact surface.

6. A method as defined in claim 1, wherein said projection means comprises an elongate strip extending along said contact surface.

* * * * *